May 17, 1949.　　　P. C. ROCHE　　　2,470,723

PLASTIC FASTENING

Filed May 31, 1946

INVENTOR.

BY Paul C. Roche

Ralph Hammar attorney

Patented May 17, 1949

2,470,723

UNITED STATES PATENT OFFICE 2,470,723

PLASTIC FASTENING

Paul C. Roche, Erie, Pa., assignor to National Organ Supply Company, Erie, Pa., a corporation of Pennsylvania Application May 31, 1946, Serial No. 673,393

1 Claim. (Cl. 279—89)

This invention is intended to provide an arrangement for fastening an inserted part, such as a tool shank, in a molded plastic part, such as a handle. In a preferred form the shank receiving tunnel is formed by a retractable core abutting another core forming a transverse passageway. At the joint between the cores there is an offset forming a locking shoulder facing away from the tunnel entrance and cooperating with a locking projection on the shank. Further objects and advantages appear in the specification and claims.

Figure 1:
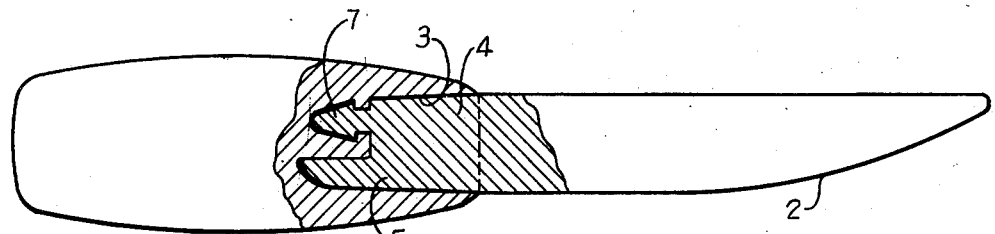
Figure 2:
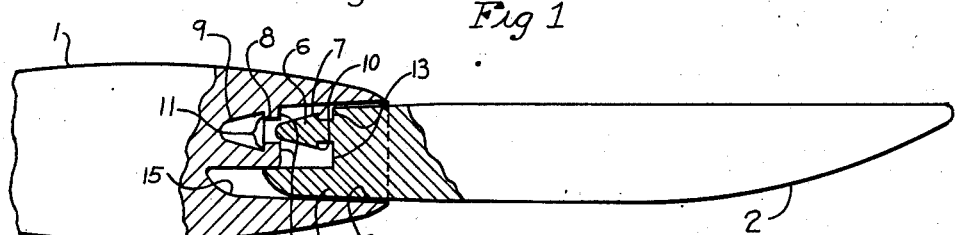
Figure 3:
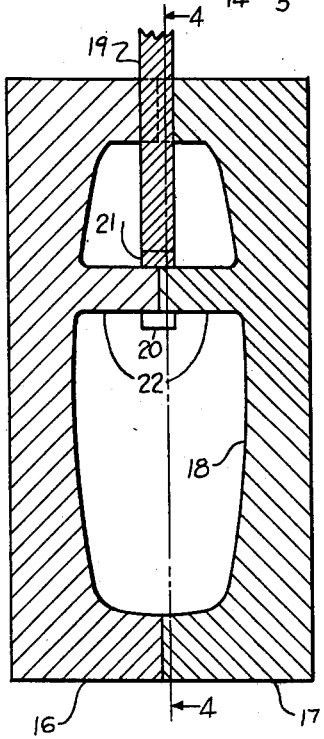
Figure 4:
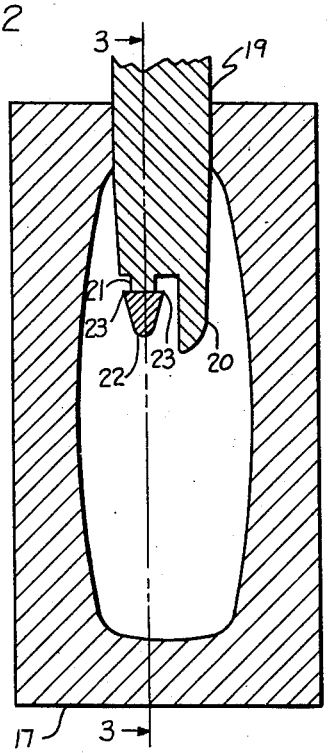

In the drawing, Fig. 1 is a side elevation, partly broken away, of a knife; Fig. 2 is a similar view showing the knife blade in the process of insertion into the handle; Fig. 3 is a section through the mold for the handle in section on line 3—3 of Fig. 4; and Fig. 4 is a section on line 4—4 of Fig. 3.

Referring to the drawing, 1 indicates the handle and 2 the blade of a paper knife, both parts being made of molded plastic. At one end of the handle is a tunnel 3 receiving a shank 4 of the knife blade. At the inner end of the shank are tongues 5 and 6, the tongue 5 serving as a guide and the tongue 6 having an enlarged tapered head 7 forced through a restriction 8 in the tunnel into a passageway 9 transverse to the tunnel. The plastic handle yields during the insertion of the head 7.

In the inserted position shoulders 10 on the head 7 engage shoulders 11 in the passageway 9 beyond and offset from the restriction 8 of the tunnel and prevent removal of the blade. Inward thrust on the knife blade is resisted by shoulders 13 which butt against surfaces 14 at the end of the tunnel. The tongue 5 fits in a similarly shaped extension 15 of the tunnel and assists in preventing edgewise movement of the blade in the handle. Once assembled the blade and handle are rigidly connected.

The mold for the handle comprises mating parts 16 and 17 defining the mold cavity 18. Suitably mounted in the mold is a retractable core 19 conforming to the shape of the shank 4 of the knife blade. At the inner end of the core 19 is an extension 20 forming the passage 15 and an extension 21 butts against and forms a fluid tight joint with core members 22 carried by the mold parts and forming the passageway 9 transverse to the tunnel and conforming to the shape of the head 7. As shown in Fig. 4, the core members 22 are offset on each side of the extension 21 and the offset portions 23 form the shoulders 11 facing away from the tunnel entrance and preventing removal of the knife blade.

The fastening construction is adapted to plastics which are essentially rigid but which have sufficient resilience to permit assembly.

What I claim as new is:

A part of flexible plastic having molded therein a tunnel and a passageway leading from the outside of the part and extending transverse to and intersecting the tunnel, a part of the passageway being offset to one side of the tunnel to provide a locking shoulder facing away from the tunnel entrance, and a mating part having a shank received in the tunnel and a head on the shank received in the passageway and engaging the shoulder.

PAUL C. ROCHE.

REFERENCES CITED

The following references are of record in the file of this patent:

UNITED STATES PATENTS

| Number | Name | Date |
|---|---|---|
| 209,679 | Hart et al. | Nov. 5, 1878 |
| 844,072 | Widmann | Feb. 12, 1907 |
| 845,340 | Drew | Feb. 26, 1907 |
| 1,064,206 | Gauld | June 10, 1913 |
| 1,500,402 | Lewis | July 8, 1924 |
| 1,804,959 | Stuart | May 12, 1931 |
| 1,978,532 | Gurnee | Oct. 30, 1934 |
| 2,209,413 | Marinsky | July 30, 1940 |
| 2,266,887 | McCoy | Dec. 23, 1941 |
| 2,295,444 | Woodward | Sept. 8, 1942 |
| 2,388,986 | Morin | Nov. 13, 1945 |
| 2,403,780 | Barbieri | July 9, 1946 |